No. 786,506. PATENTED APR. 4, 1905.
F. MACKINTOSH.
MOTOR CONTROLLING SWITCH.
APPLICATION FILED FEB. 17, 1904.

4 SHEETS—SHEET 1.

WITNESSES:

INVENTOR
Frederick Mackintosh.
by
Atty.

No. 786,506. PATENTED APR. 4, 1905.
F. MACKINTOSH.
MOTOR CONTROLLING SWITCH.
APPLICATION FILED FEB. 17, 1904.

4 SHEETS—SHEET 2.

WITNESSES:
Erning R Gurney
Helen Alford

INVENTOR
Frederick Mackintosh
by Albert G. Davis
Atty.

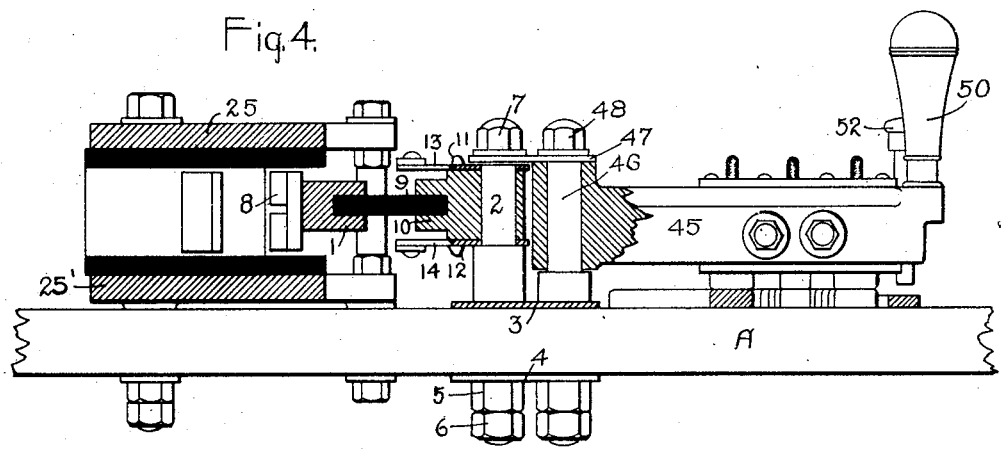
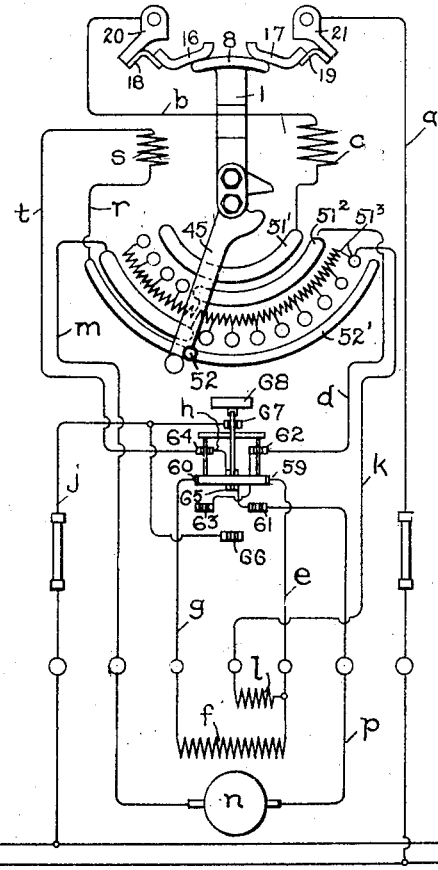
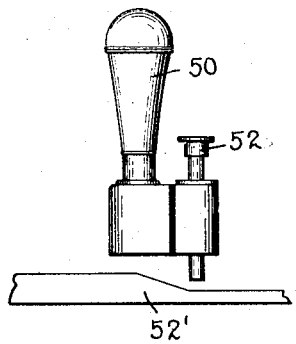

No. 786,506. PATENTED APR. 4, 1905.
F. MACKINTOSH.
MOTOR CONTROLLING SWITCH.
APPLICATION FILED FEB. 17, 1904.

4 SHEETS—SHEET 4.

WITNESSES:

INVENTOR:
Frederick Mackintosh,
by Allen H. Davis
Atty.

No. 786,506.

Patented April 4, 1905.

UNITED STATES PATENT OFFICE.

FREDERICK MACKINTOSH, OF SCHENECTADY, NEW YORK, ASSIGNOR TO GENERAL ELECTRIC COMPANY, A CORPORATION OF NEW YORK.

MOTOR-CONTROLLING SWITCH.

SPECIFICATION forming part of Letters Patent No. 786,506, dated April 4, 1905.

Application filed February 17, 1904. Serial No. 194,096.

*To all whom it may concern:*

Be it known that I, FREDERICK MACKINTOSH, a citizen of the United States, residing at Schenectady, in the county of Schenectady and State of New York, have invented certain new and useful Improvements in Motor-Controlling Switches, of which the following is a specification.

The present invention relates to means for controlling and protecting electric motors, and has for its object to improve the general construction and method of operation of apparatus of this character whereby protection is insured against natural or abusive overloads, loss of voltage on the line, too rapid starting, burning out of starting-resistance, destructive field-discharges, and carelessness or ignorance on the part of the operator.

My invention, while not restricted thereto, is particularly applicable to controlling the electric motors which operate chain hoists, such as are used aboard battle-ships for raising ammunition and in similar places where certainty of action is of the highest importance.

The invention will be more readily understood by reference to the following description and the accompanying drawings, forming a part of this specification, in which—

Figure 1:
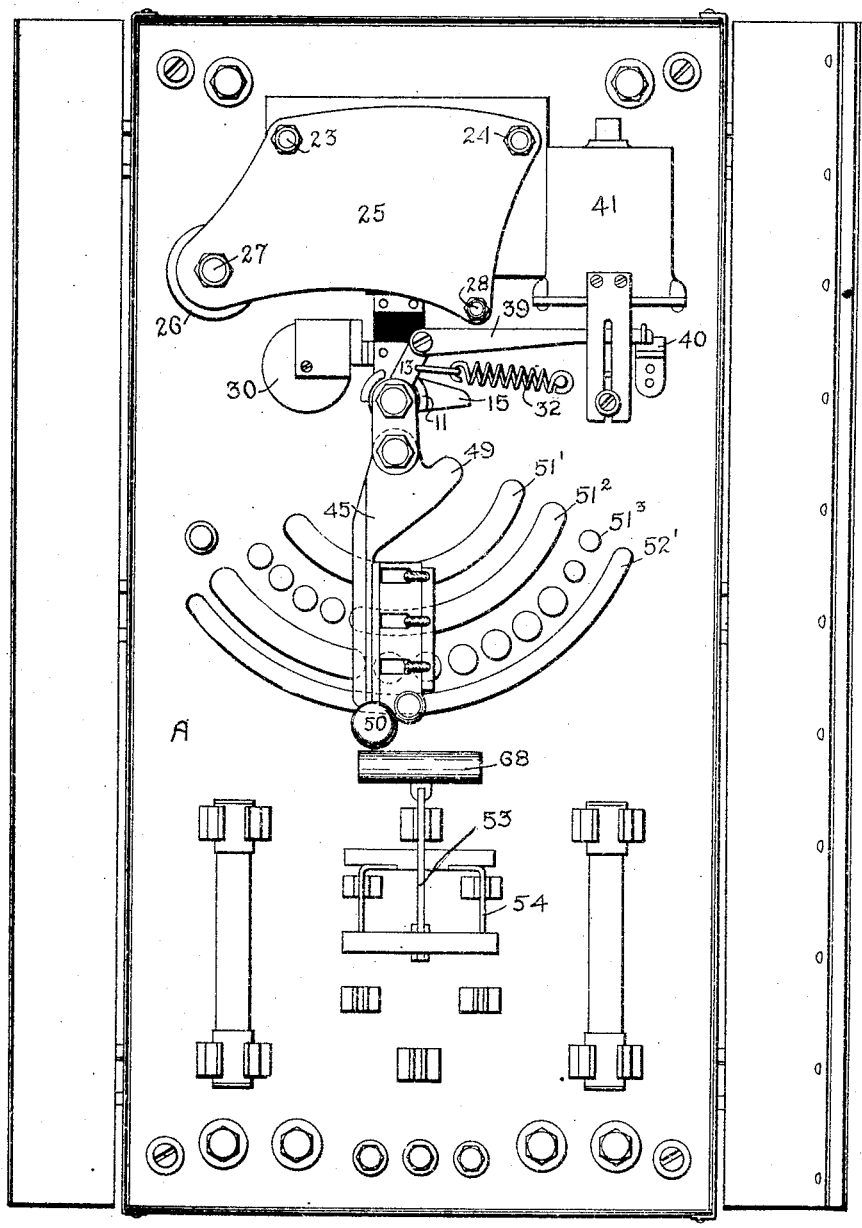
Figure 2:
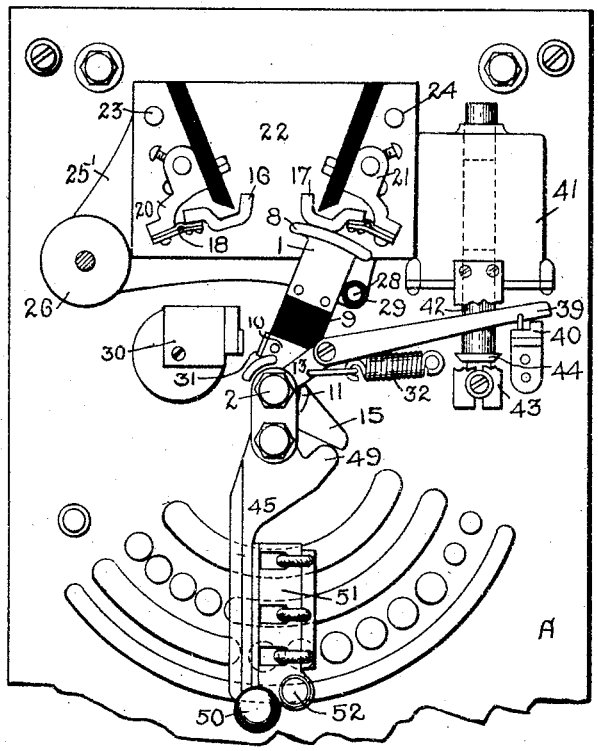
Figure 3:
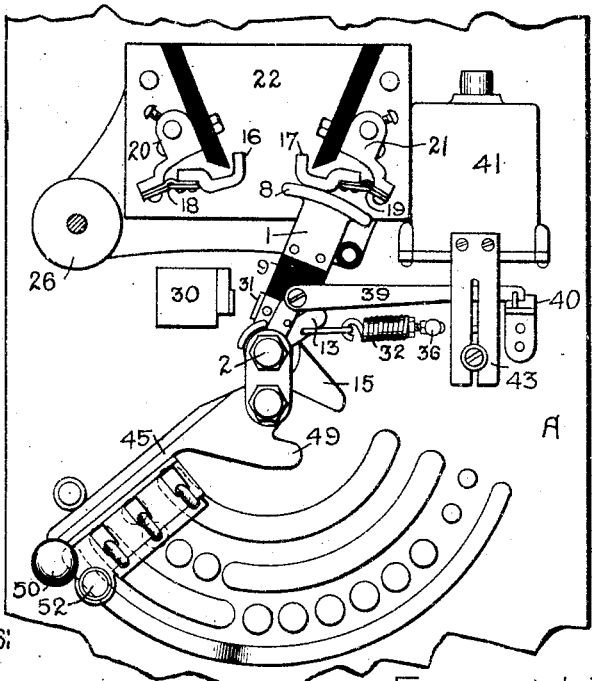
Figure 7:
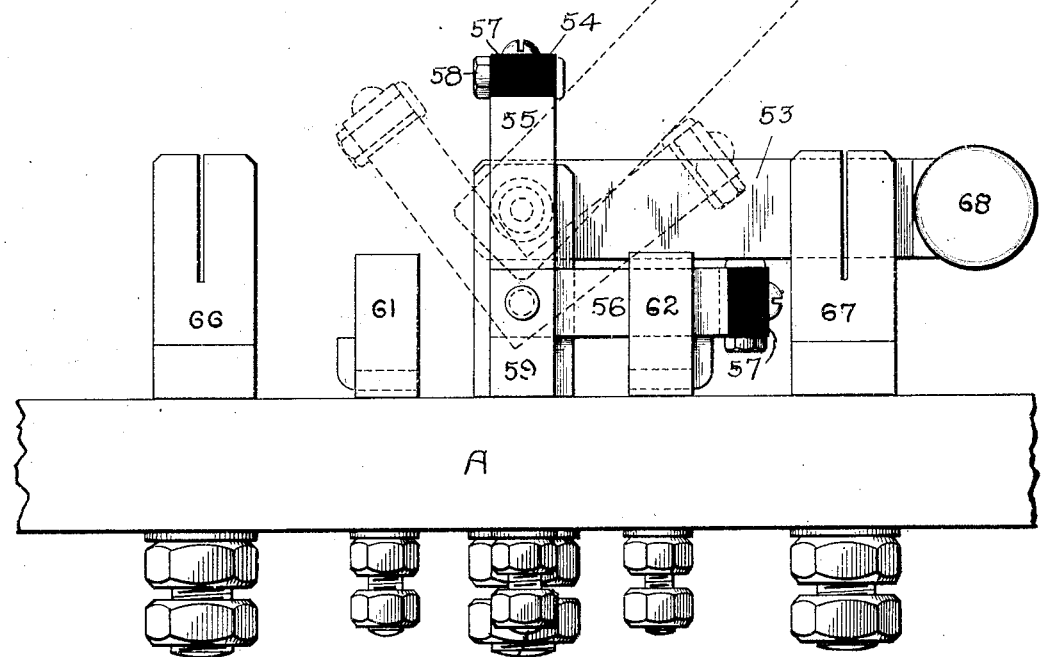
Figure 8:
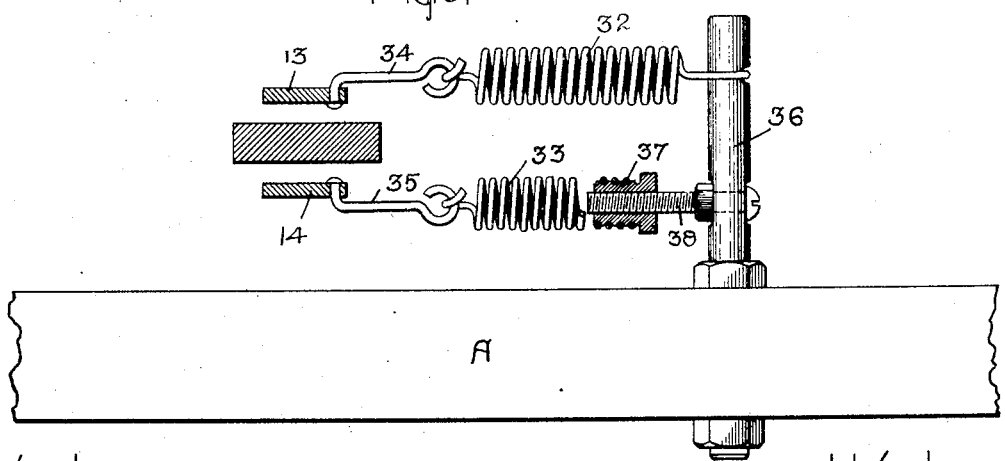

Figure 1 is a front elevation of a controller-panel embodying one form of my invention. Figs. 2 and 3 are similar views of the upper part of the same with a pole of the blow-out magnet removed, showing the movable parts in different operative position. Fig. 4 is a view in part section and part elevation of the circuit-breaker and the controller-lever. Fig. 5 is a conventional diagram of the electrical connections. Fig. 6 is an end elevation of the controller-handle and a section of the outer contact-segment. Fig. 7 is a side elevation of the reversing-switch, and Fig. 8 is a detail view of the latch-springs of the circuit-breaker.

In the particular constructions shown in the drawings the panel-board A is of stone or other insulating material and supports upon its face all the operating parts and their stationary contacts, while the various resistances and leads are connected at the back thereof in the usual manner. The movable part or arm 1 of the circuit-breaker is pivoted upon a shouldered stub-shaft 2, which passes through the panel-board A and two bearing-plates 3 and 4 and is held in fixed position by lock-nuts 5 and 6 at the back. The front end of the shaft 2 is provided with a nut 7, whereby the breaker-arm 1 may be readily removed. The arm 1 comprises a segmental T-shaped contact part 8, an intermediate portion 9 of insulation, and a hub part 10. The hub part 10 is provided on its front and back faces with shouldered projections 11 and 12, which engage the edges of spring-actuated arms 13 and 14, and extending from one side is a toe-piece 15 at right angles to the breaker-arm. The stationary contacts 16 and 17, with which the contact part 8 engages, are supported by springs 18 and 19 from brackets 20 and 21, which are supported by the rear chute-plate 22 of the circuit-breaker and provided with connection-bolts which project through to the back of the panel. The exciting-coil 26 of the blow-out magnet is carried by a bolt 27, which projects through the magnet-plates 25 and 25' at its lower left-hand corner. The lower right-hand corners of the plates 25 and 25' are pierced by a brass bolt 28, provided with an insulating-bush 29, which also serves as a stop for the breaker-arm. The upper corners of the plates are connected by brass bolts 23 and 24. By this arrangement ready access may be had to the breaker-contacts by merely removing the nuts carried by the bolts 23, 24, 27, and 28.

A no-voltage magnet 30 is secured to the panel-board A to the left of the breaker-arm and is adapted when properly excited to coöperate with an armature 31, carried by the arm 14, and holds the arm against the tension of the spring 33. The arms 13 and 14 are pivoted upon the stub-shaft 2 at opposite sides of the hub 10 and, as shown in Fig. 8, are connected to their respective springs 32 and 33 by links 34 and 35. The outer ends of the springs are supported from a post 36, secured to the panel-board A, the front spring 32 being supported directly and the back spring 33 by means of an adjustable nut 37 and screw 38, whereby the tension of the spring may be increased or decreased at will. The front arm 13 carries at its outer end a latch 39, which is adapted to engage at its free end with a stationary shouldered projection 40 and relieve the breaker-arm when in operative position of the tension of the front spring 32.

An overload solenoid 41 is secured to the panel-board at the right of the blow-out magnet, with its armature 42 supported by the adjustable support 43 and provided with a projection 44, adapted to engage the latch 39 and raise it from engagement with the shoulder 40 when the current exceeds a certain predetermined limit. When the latch 39 is released, the spring 32 becomes free to exert its tension upon the breaker-arm through the arm 13 and projection 11 and draws it to the right, opening the circuit.

The controller-lever 45 is pivoted, independent of the breaker-arm, to a stub-shaft 46, similar to shaft 2 of the breaker-arm, located adjacent thereto and connected therewith by a link-plate 47 beneath their respective nuts 7 and 48. The lever 45 is provided near its fulcrum with a projection 49, adapted to engage the toe-piece 15 of the breaker-arm and force the latter into closed position when the controller-lever 45 is moved to the right. The outer end of the lever 45 is provided with a handle 50 and adjacent thereto is secured an insulated box or bus-bar 51, carrying the brushes for the respective contact-segments, and a push-bolt 52. In the construction shown there are four rows or arcs of contacts, the innermost contact-segment, $51'$, being continuous, the two intermediates, $51^2$ and $51^3$, being part continuous and part with resistances, and the outer one, $52'$, continuous and having its contact-surface in two planes connected by an incline, as indicated in Fig. 6.

The motor-switch shown in Figs. 1, 5, and 7 comprises a combination of a main switch 53 of the single-pole double-throw type and an interlocking double-pole double-throw switch 54. The double-pole switch 54 consists of two pairs of angularly-displaced contact-arms 55 56, which are correspondingly connected by bridge-pieces 57 of insulation, which are provided at their center points with transverse bolts 58. The switch 54 is pivoted in the front ends of two binding-posts 59 and 60, which extend through the panel-board A and carry nuts for securing the motor connections at the back of the board. Stationary contacts 61, 62, 63, and 64 are also provided with which the switch 54 is adapted to contact and which are connected with binding-posts on the back of the panel-board. The single-pole switch 53 is made of a heavier metal than the double-pole switch 54, and the length of its arm is nearly twice that of the arms of the double-pole switch. As shown in Fig. 7, the single-pole switch is pivoted to a binding-post 65, located between the pivots 59 and 60 of the double-pole switch at a point considerably farther out from the face of the panel-board, and is adapted to make engagement with either of the stationary contacts 66 67, also provided with binding-posts at the opposite side of the board. The single-pole switch 53 only is provided with a handle 68, the double-pole switch being accordingly dependent upon the action of the former in opening and closing, and is normally locked in either closed position thereby. As indicated in dotted lines in Fig. 7, the switch 53 is adapted to be moved a considerable distance away from its stationary contacts before engaging the stop formed by the head of the bolt 58 in the bridge-piece 57 of the outstanding or idle switch-blades, so that the respective currents carried by switch members 53 and 54 are broken non-simultaneously. When closing the switch to the opposite side, the double-pole switch 54 is carried into engagement with its contacts before switch 53 approaches its respective contact.

Referring to Fig. 5, the current is assumed to pass through the right-hand lead $a$, through the circuit-breaker, conductor $b$, and coil $c$ of the overload magnet to the inner contact-segment $51'$, from which its passes, by means of the brushes, to the intermediate contacts $51^2$ and $51^3$ and the push-bolt 52. From contacts $51^2$ part of the current passes by conductor $d$ to contact 62 of the double-pole switch to post 59, shunt field-lead $e$, motor-field $f$, lead $g$ to post 60, contact 64, connection $h$ to post 65 of the single pole switch 53 to its contact 67, and back to the main line by conductor $j$. A part of the current also passes from the intermediate contacts $51^3$ by the conductor $k$ to the solenoid-coil $l$ to release the friction-brake. Another part of the current passes through the resistances in the intermediate row of contacts $51^3$ to the armature-lead $m$, armature $n$, lead $p$ to post 65, through single-pole switch 53 to conductor $j$. In order to excite the no-voltage magnet 30, whereby the breaker-arm is held in closed position, a branch circuit is closed by pressing the push-bolt 52 into contact with segment $52'$. The current then will pass by wire $r$ through magnet-coil $s$, wire $t$ to contact 64, connection $h$ to the single-pole switch 53. The controller-lever may now be moved to the left, cutting out resistance from the armature-circuit; but care must be taken to hold the bolt 52 in engagement with its segment $52'$ or else the no-voltage magnet will release the breaker-arm and open the circuit. The segmental contact $52'$, as above stated, has its contact-surface in two planes connected by an incline which is located substantially opposite the last resistance-contact to the left in the row $51^3$, so that when the controller-arm has passed over all the resistance-contacts of row $51^3$ or reached the position indicated in Fig. 5 the bolt 52 will normally rest upon the higher surface of contact 52'. The controller-lever 45 may now be left in any position to the left of that shown in Fig. 5 without liability of the circuit-breaker arm being released, except on failure of current or from overload. Further movement of the controller-lever 45 to the left of the position indicated in Fig. 5 serves to cut resistance into the motor-field circuit and produce a speeding-up effect in the motor. When it is desired to stop the motor, the circuit is broken by pulling out the switch-arm 53. The motor-field being still connected with the armature-circuit discharges therethrough by passing by lead $g$ to post 60, contact 64, connection $h$ to the armature-leads $p$ and $m$, contacts $51^3$ and $51^2$, wire $d$, contact 62, switch 54, back to the field-lead $e$, and the no-voltage magnet 30 being deënergized releases the breaker-arm, which thereupon moves under the stress of spring 33 into its "off" position, from which it cannot be moved to restart without first moving the controller-lever 45 to its extreme right position and cutting in all the resistance of the armature-circuit. It is apparent that the same result is produced when the current is broken at the circuit-breaker through the action of the no-voltage or overload magnets. When it is desired to reverse the direction of the motor, the switch-arm 53 is thrown toward its opposite closed position, carrying the double-pole switch 54 with it and closing the latter in advance thereof.

I do not desire to restrict myself to the particular construction or arrangement of parts shown, since the same may be changed and modified without departing from my invention.

What I claim as new, and desire to secure by Letters Patent of the United States, is—

1. The combination with a motor-rheostat switch provided with independent contacts for the field and armature circuits, a controller-lever having permanent electrical engagement with said contacts, and means for breaking the motor-circuit outside of said rheostat.

2. The combination with a motor-rheostat switch provided with independent series of resistance-contacts for the field and armature circuits of the motor, a controller-lever having permanent electrical engagement with and mutually connecting said series of contacts, and means for breaking the motor-circuit outside of said rheostat.

3. The combination of a circuit-breaker, a no-voltage magnet for holding said breaker in closed position, a motor-rheostat switch provided with independent contacts for the field and armature circuits, a continuous contact with its operative surface in two planes and connected to the circuit of the no-voltage magnet, and a controller-arm coöperating with the said contacts and provided with an electrically-connected push-bolt which normally engages the higher operative surface of the continuous contact and is adapted to be forced into engagement with the lower surface to complete the circuit through the no-voltage magnet.

4. The combination of a pivoted breaker-arm, spring means tending to move said arm into open position, and an eccentrically-pivoted controller-lever adapted when moved in one direction to engage the breaker-arm and move it against the tension of the spring means into closed position.

5. The combination of a pivoted current-controlled breaker-arm provided with a toe projecting from one side thereof, and an eccentrically-pivoted controller-arm provided with a projection adapted to engage said toe and move said breaker-arm into its closed position when said controller-arm is moved in one direction.

6. The combination of a pivoted breaker-arm provided with shouldered projections, two coaxially-pivoted arms adapted to engage said projections, springs arranged to exert tension on said arms, means for adjusting the relative tension of said springs, means for holding said arms from movement under the tension of said springs, and current-controlled means for releasing said holding means.

7. The combination of a pivoted main switch provided with means for actuating it, and a two-armed switch pivoted in proximity to the pivot of the main switch and each arm provided with a projection extended into the path of the main switch.

8. The combination of a pivoted main switch provided with means for actuating it, and an independent switch having two angularly-displaced arms pivoted in proximity to the pivot of the main switch and each arm provided with a projection extended into the path of the main switch.

9. The combination of a pivoted main switch and an independent switch having pairs of angularly-displaced arms respectively connected by bars of insulation and pivoted in proximity to the pivot of the main switch whereby the two switches are adapted to interlock.

In witness whereof I have hereunto set my hand this 11th day of February, 1904.

FREDERICK MACKINTOSH.

Witnesses:
  BENJAMIN B. HULL,
  HELEN ORFORD.